United States Patent

[11] 3,581,018

[72] Inventors Geoffrey Harland
London;
John P. Ronayne, Edgware, England
[21] Appl. No. 832,678
[22] Filed June 12, 1969
[45] Patented May 25, 1971
[73] Assignee International Standard Electric Corporation
New York, N.Y.
[32] Priority June 28, 1968
[33] England
[31] 30935/68

[54] MULTISTAGE TELEPHONE SWITCHING NETWORK
10 Claims, 3 Drawing Figs.

[52] U.S. Cl. .......... 179/22, 179/18AG
[51] Int. Cl. .......... H04q 3/00
[50] Field of Search .......... 179/18 (AG), 22

[56] References Cited
UNITED STATES PATENTS
3,041,409 6/1962 Zarouni .......... 179/22

*Primary Examiner*—William C. Cooper
*Attorneys*—C. Cornell Remsen, Jr., Walter J. Baum, Percy P. Lantzy, J. Warren Whitesel, Delbert P. Warner and James B. Raden

ABSTRACT: A telecommunications exchange in which connections are set up through cascaded stages (designated A, B, C & D) of coordinate switching matrices. Certain of the stages are paired in two-stage networks, and a number of these networks (four are disclosed) are used. The intermediate stages (B and C) of a four stage exchange are paired, and certain of the B stage switches handle only calls to and from lines, and others handle only calls to and from junctions. The third or C stage mixes calls involved in traffic of either type. The switches of the final or D stage are used only between one side of the links and the switches of the C stage.

PATENTED MAY 25 1971 3,581,018

SHEET 2 OF 3

MULTISTAGE TELEPHONE SWITCHING NETWORK

Figure 1:
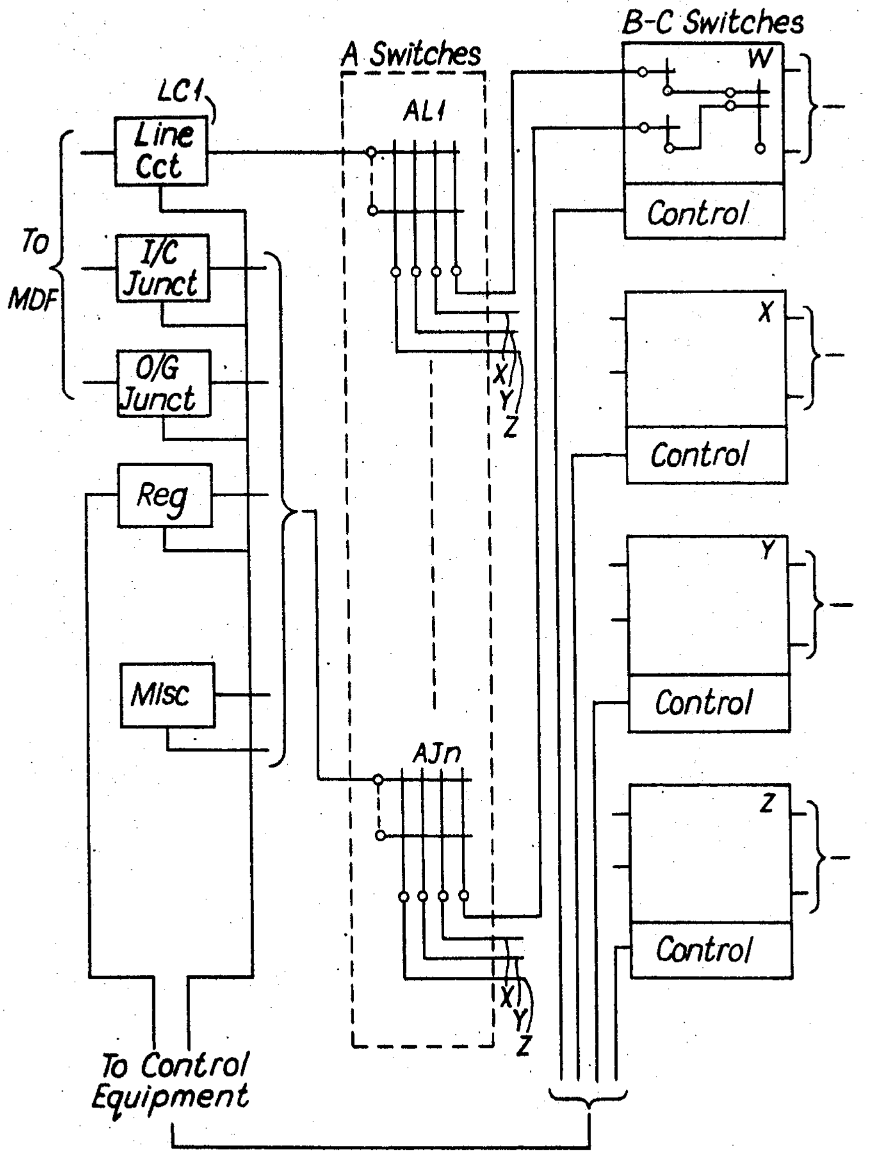

This invention relates to an automatic telecommunication exchange in which connections are set up via cascaded stages of coordinate switching matrices. Examples of such matrices, which are often called cross-point matrices, include electromechanical crossbar switches, matrices of electromagnetic relays such as sealed contact reed relays, and matrices of electronic devices each settable to an "on" or an "off" condition.

In U.S. Pats. Nos. 3,214,524 and 3,272,924, there are described telecommunication exchanges using a trunking principle known as "sectionalization". In such exchanges, when coordinate switching matrices are used, an important part of the switching network consists of a number, e.g. four, of two-stage switching networks, conveniently designated BC networks, whose inlets are connected to links one of which is used for each call set up. Each such link is connected between inlets of C switches, in two different ones of the BC networks.

The lines served by the exchange are connected to outlets of a further stage of switches, referred to as A switches, and each A switch has its inlets connected to at least one outlet of every one of the sections. Thus each line is connectable via its A switch to a B switch of every one of the BC sections.

When a connection is set up between two of the lines served by the exchange, a free link is seized for use for that connection and one end thereof is connected to the calling line via a C switch, a B switch and an A switch, and the other end thereof is connected to the wanted line via a C switch, a B switch and an A switch. The two "passages" through the B and C stages for the same call are set up via different ones of the BC sections.

As hitherto proposed, each of the BC sections includes separate BC switching arrays for calls which involve lines only and calls which involve junctions to or from other exchanges.

An object of this invention is to provide an exchange which exploits the "sectionalization" principle as described above, and which is more economical than hitherto-proposed exchanges.

According to the present invention there is provided an automatic telecommunication exchange, in which connections are set up via cascaded stages of coordinate matrices, there being four of said stages referred to hereinafter as A switches, B switches, C switches and D switches respectively, in which the devices served include subscriber's lines and incoming and/or outgoing junctions which are connected to A switch outlets, in which said devices served are divided into two groups, with a first set of said A switches serving only devices of one group and a second set of said A switches serving devices of the other group, in which the B and C switches are arranged as a plurality of sections with the B and C switches of each section interconnected as two-stage switching networks, in which each said A switch has a number of inlets at least equal to the number of said sections, each said A switch being accessible from every one of said sections, in which each said BC switch section includes a first set of B switches whose outlets go to A switches of said first set and a second set of B switches whose outlets go to A switches of said second set, in which within each said two-stage switching network each said B switch is accessible from every one of the C switches of that network and each C switch has access to every one of the B switches of that section in which links are provided one of which is used for each connection to be set up, each said link having one of its two ends connected to a C switch inlet and the other of its ends connected to a D switch inlet, in which the D switch outlets are connected to C switch inlets such that when a D switch is set to connect one of said links between two C switch inlets those C switch inlets belong to C switches in different ones of said sections, and in which each connection between two of said devices is set up by connecting one end of a free link to one of said devices via a C switch, a B switch and an A switch and by connecting the other end of that link to the other of said devices via a D switch, a C switch, a B switch and an A switch, the C and B switches used for the two parts of the connection being in different ones of said sections.

The use of a fourth stage of switches, the D switches mentioned above, enables the number of links to be reduced at the cost of providing those D switches. This is economical because the D switches improve the utilization of the links, which latter are relatively expensive devices by comparison with the D switches. A further economy in cross-points is also obtained by the "combined" B and C switching stage arrangement referred to above.

Figure 2:
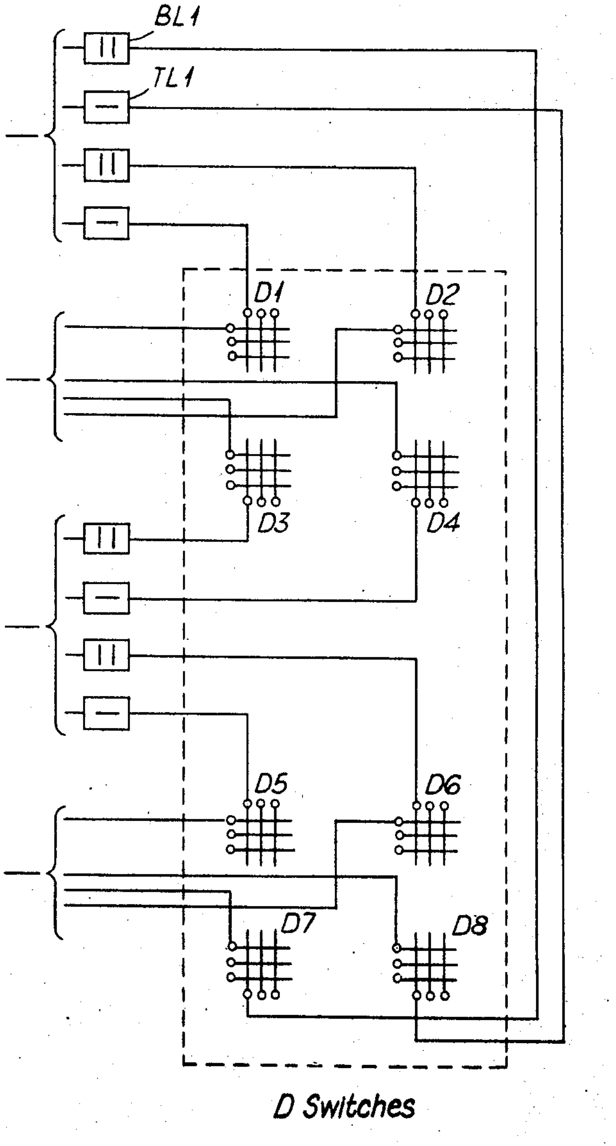
Figure 3:
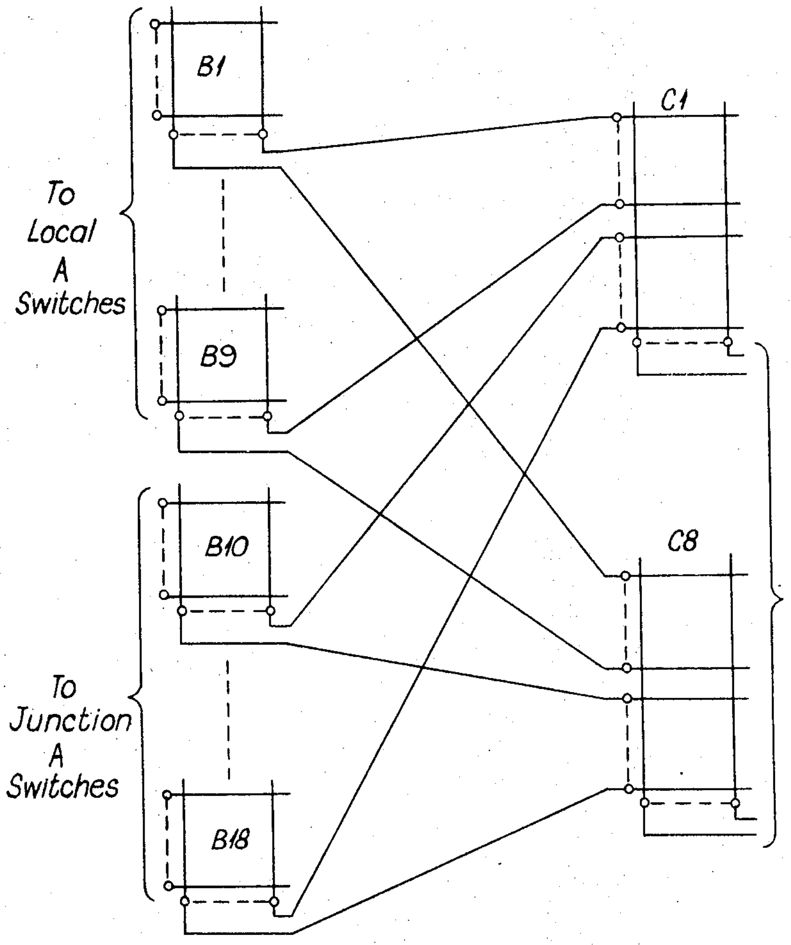

An embodiment of the invention will now be described with reference to the drawings, in which FIGS. 1 and 2, of which FIG. 2 should be placed to the right of FIG. 1, together show an exchange according to the invention, and FIG. 3 shows the arrangements of a BC switch section.

In the accompanying drawings, the trunking arrangements are represented in a highly schematic manner, and in general the control circuitry is not shown at all. This is because it can in general follow the principles set out in British Pat. Specification No. 1,057,218 (Standard Telephones and Cables Limited, Her Majesty's Postmaster-General, and Automatic Telephone and Electric Company Limited).

Referring first to FIGS. 1 and 2, it will be seen that the exchange includes four stages of coordinate matrix switches, referred to as A switches, B switches, C switches and D switches. In the exchange actually described, these switches are each constituted by a coordinate matrix of sealed contact reed relays.

The first stage of switches, the A switches, includes a number of switches referred to as local A switches, one of which, AL1, is shown and a number of switches referred to as junction A switches, one of which, AJ*n*, is shown. Each local A switch serves a group of 10 subscribers' lines whose line circuits such as LC1 are connected to its outlets. Each of these lines served is connected to one of these line circuits such as LC1 via the main distribution frame MDF (not shown). Each junction A switch serves a group of of other circuits such as incoming and outgoing junctions from or to remote exchanges, registers and other miscellaneous "facilities" circuits. These latter are indicated by the boxes suitably labeled and bracketed together, with the connection from the bracket extending to an AJ*n* outlet. Each of these junction A switches has 10 outlets, and thus serves 10 circuit elements such as junctions, registers, etc.

The next switches to be considered are the B and C switches and these are grouped in a number of sections each of which includes a B stage and a C stage interconnected in "primary-secondary" manner. In the exchange described there are four such sections, W, X, Y and Z, and each has some control circuitry associated with it, as indicated by the boxes labeled "-CONTROL." These, like the line circuits, etc. are connected as indicated schematically, to the exchange control equipment.

To consider a single section in more detail, we will now refer to FIG. 3, which shows one of the BC assemblies in more detail. This array is referred to as a combined switch unit, and it includes two sets of B switches, B1–B9 and B10–B18, each of which is coupled by an interswitch connection such as *b* 1–*c* 1 to every one of the C switches. The first set of B switches, each of which has 8 inlets from the 8 C switches, each have 10 outlets to local A switches, i.e. to A switches serving subscribers' lines. The second set of B switches, each of which has 8 inlets from the 8 C switches, each have 10 outlets to junction A switches, i.e. to A switches serving junctions, etc. Thus the two forms of traffic, i.e. local traffic and nonlocal traffic are mixed in the combined switch unit.

It will be appreciated that the numbers of the switches in the B and C stages and also the sizes of those switches, depend on the size and traffic-handling capability of the exchange. Also a combined switch unit may have different numbers of "local" B switches and "junction" B switches. Further, in most cases each of the sections formed by the B and C stages may include two or more combined switch units each interconnecting a different set of A switch inlets and links or D switches (see below).

Reverting to FIGS. 1 and 2, and especially to FIG. 2, it will be seen that FIG. 2 shows a further set of switches, the D switches, and the links, and that the inlets to the C switches of the W and Y sections are connected directly to the links, while the X and Z sections have their C switch inlets connected to the D switches, which are also connected to the links.

The links are of two sorts, one sort, such as BL1 being a so called bridge link, since it incorporates a power feeding arrangement, and is used on a locally terminating call, while the other, such as TL1 is a so called through link, used for nonlocally terminating calls. The bridge links are represented with two parallel upright lines in a box and the through links with one horizontal line in a box. The links are all reversible, i.e. either end can be connected to a calling line or junction, and switching means is provided inside each link to enable this to be effected. One way in which this can be done is described in British Pat. No. 916,637 (Associated Electrical Industries Limited).

Although only eight D switches are shown, it will be appreciated that the number and the size of these switches depends on the number of links to be dealt with, and also on the number of sections. Hence each D switch actually shown typifies a number of such switches. From an inspection of FIGS. 1 and 2, it will be seen that each D switch only deals with links of one type. Thus D 1 is used for calls requiring a through link and set up via sections W and X, D2 is used for calls which need a bridge link and set up through sections W and X and so on.

The control technique used in call setting in the exchange described herein is that when a subscriber initiates a call, or an incoming call arrives over a junction, the calling line or junction is detected by a scanner, which as described in the above-mentioned U.S. Pat. No. 1,057,218, scans junctions much quicker than lines. Then a connection is set up under control of the common equipment of the exchange to a free register.

In the case of a call over a junction, the register receives the wanted number's digits, and sets up a further connection from the junction to that line or to an outgoing junction. The original incoming junction-to-register connection is then dropped. In the case of an outgoing junction call, digit sending equipment may be needed, in which case the register is initially connected to a sender via the switching network, and the sender connected to the junction. These connections are only held as long as needed, the final connection using the junction-register connection. This use of two or more connections "in series" is known as serial trunking.

In the case of a local call, the caller receives dial tone after the register has been seized, which therefore reaches the line via A-B-C-D-link-C-B-A, or via A-B-C-link-D-C-B-A (since links are reversible). The wanted digits are received by the register over this path, and when enough are in for determination as to whether it is a local call, the register seizes translation means to effect this determination. If it is an outgoing call, the operations to seize and use the junction needed for the call occurs as described above for an incoming junction to outgoing junction call. In the case of a local call, when all the wanted number is in, the control equipment causes a new connection from the calling line to the wanted line to be set up, ringing being supplied from the seized link, and the original connection to be released.

Where the connection is one terminating in the exchange a bridge link is used, as power feed is then needed, whereas in the case of a call over an outgoing junction which does not need power feed from the exchange shown, a through link is used.

In view of the description given in the above-mentioned U.S. Pat. No. 1,057,218, no further description of the control techniques used in the exchange described herein is considered necessary. Some description of the serial trunking technique mentioned above will be found in a paper entitled "Network Utilization in a Sectionalized Space-Division Switching System," by D.G. Fisher, published in IEEE Trans, on Communication Technology, Vol. COM–14, No. 3, June, 1966, at pages 237—240.

We claim:

1. An automatic telecommunication exchange, in which connections are set up via cascaded stages of coordinate matrices, there being four of said stages referred to hereinafter as A switches, B switches, C switches and D switches respectively, in which the devices served include subscribers' lines and incoming and/or outgoing junctions which are connected to A switch outlets, in which said devices served are divided into two groups, with a first set of said A switches serving only devices of one group and a second set of said A switches serving only devices of the other group, in which the B and C switches are arranged as a plurality of sections with the B and C switches of each section interconnected as two-stage switching networks, in which each said A switch has a number of inlets at least equal to the number of said sections, each said A switch being accessible from every one of said sections, in which each said BC switch section includes a first set of B switches whose outlets go to A switches of said first set and a second set of B switches whose outlets go to A switches of said second set, in which within each said two-stage switching network each said B switch is accessible from every one of the C switches of that network and each C switch has access to every one of the B switches of that section, in which links are provided one of which is used for each connection to be set up, each said link having one of its two ends connected to a C switch inlet and the other of its ends connected to a D switch inlet, in which the D switch outlets are connected to C switch inlets such that when a D switch is set to connect one of said links between two C switch inlets those C switch inlets belong to C switches in different ones of said sections, and in which each connection between two of said devices is set up by connecting one end of a free link to one of said devices via a C switch, a B switch and an A switch and by connecting the other end of that link to the other of said devices via a D switch, a C switch, a B switch and an A switch, the C and B switches used for the two parts of the connection being in different ones of said sections.

2. An automatic telecommunication exchange, in which connections are set up via cascaded stages of coordinate matrices, there being four of said stages referred to hereinafter as A switches, B switches, C and D switches respectively, in which subscribers' lines and incoming and/or outgoing junctions are connected to A switch outlets, said A switches including a first set of switches which only serve lines and a second set of switches which serve junctions, in which the B and C switches are arranged as a plurality of sections with the B and C switches of each section interconnected as two-stage switching networks, in which each said A switch has a number of inlets at least equal to the number of said sections, each said A switch being accessible from every one of said sections, in which each said BC switch section includes a first set of B switches whose outlets go to A switches of said first set and a second set of B switches whose outlets go to A switches of said second set, in which within each said two-stage switching network each B switch is accessible from every one of the C switches of that network and each C switch has access to every one of the B switches of that section, in which links are provided one of which is used for each connection to be set up, each said link having one of its two ends connected to a C switch inlet and the other of its ends connected to a D switch inlet, in which the D switch outlets are connected to C switch inlets such that when a D switch is set to connect one of said links between two C switch inlets those C switch inlets belong to C switches in different ones of said sections, and in which each connection between a first circuit, which is a line or a junction, and a second circuit, which is also a line or a junction, is set up by connecting one end of a free link to one of said circuits via a C switch, a B switch and the A switch to which that one circuit is connected, and by connecting the other end of that link to the other of said circuits via a D switch, a C switch, a B switch and an A switch, the C and B switches used for the two parts of the connection being in different ones of said sections.

3. An automatic telecommunication exchange as claimed in claim 2, in which said second set of A switches also serve registers.

4. An automatic telecommunication exchange as claimed in claim 2, in which each said link is a reversible device, switching means being provided therein to set the link in accordance with the direction in which it is to be used.

5. An automatic telecommunication exchange as claimed in claim 2, in which the said links include links of a first sort used for calls which terminate on lines served by the exchange and a second sort used for calls for which an outgoing junction is needed, and in which the links of said first sort include power feed means.

6. An automatic telecommunication exchange as claimed in claim 5, in which said D switches are split into two sets of switches, one of which sets serves only links of said first set and the other of which sets serves only links of said second set.

7. An automatic telecommunication exchange as claimed in claim 2, and in which each said section includes a plurality of said two stage switching networks.

8. An automatic telecommunication exchange as claimed in claim 2, in which said coordinate switching matrices are electromechanical crossbar switches.

9. An automatic telecommunication exchange as claimed in claim 2, in which said coordinate switching matrices are matrices of electronic devices each settable to an "on" or an "off" condition.

10. An automatic telecommunication exchange as claimed in claim 2, in which said coordinate switching matrices are matrices of sealed contact reed relays.